United States Patent [19]
Scherpbier

[11] Patent Number: 5,944,791
[45] Date of Patent: Aug. 31, 1999

[54] COLLABORATIVE WEB BROWSER

[75] Inventor: Andrew W. Scherpbier, San Diego, Calif.

[73] Assignee: Contigo Software LLC, San Diego, Calif.

[21] Appl. No.: 08/726,377

[22] Filed: Oct. 4, 1996

[51] Int. Cl.[6] ............................. G06F 13/38; G06F 15/17
[52] U.S. Cl. .......................... 709/218; 709/246; 709/227; 709/202; 707/513
[58] Field of Search ........................ 395/200.48, 200.33, 395/200.59, 200.3, 200.32, 200.47, 200.49, 200.76, 200.57; 707/10, 501, 513

[56] References Cited

U.S. PATENT DOCUMENTS

| | | | |
|---|---|---|---|
| 5,440,699 | 8/1995 | Farrand | 395/200.34 |
| 5,530,795 | 6/1996 | Wan | 395/200.35 |
| 5,583,993 | 12/1996 | Foster et al. | 395/200.35 |
| 5,608,426 | 3/1997 | Hester | 395/200.35 |
| 5,608,872 | 3/1997 | Schwartz et al. | 395/200.35 |
| 5,623,603 | 4/1997 | Jiang et al. | 395/200.37 |
| 5,634,018 | 5/1997 | Tanikoshi et al. | 345/329 |
| 5,649,104 | 7/1997 | Carleton et al. | 395/200.34 |
| 5,706,502 | 1/1998 | Foley et al. | 707/10 |
| 5,754,830 | 5/1998 | Butts et al. | 395/200.33 |
| 5,765,152 | 6/1998 | Erickson | 707/9 |
| 5,778,368 | 7/1998 | Hogan et al. | 395/200.33 |
| 5,781,909 | 7/1998 | Logan et al. | 395/200.3 |
| 5,809,247 | 9/1998 | Richardson et al. | |

Primary Examiner—Mark H. Rinehart
Attorney, Agent, or Firm—Lyon & Lyon LLP

[57] ABSTRACT

A pilot computer can control the Web browser of at least one passenger computer. The user of the passenger computer is instructed to log onto a control site, which downloads an active control, such as an applet, to the passenger computer. An active control is also provided to the pilot computer. If the pilot computer desires to present a particular Web page to both the pilot computer and the passenger computer for, e.g., discussing the page during a conference call, the pilot computer transmits the appropriate URL to the control site, which then retrieves the Web page. Next, the control site sanitizes the page by disabling its hyperlinks, and then the control site causes the passenger computer's active control to download the sanitized page. Also, the control site filters the page such that the hyperlinks are not disabled, but are rather encoded to point back to the control site, and this filtered page is downloaded to the pilot computer. The pilot computer can then "click" on a hyperlink, causing the control site to decode the hyperlink, retrieve the appropriate Web page, and instruct the passenger computer's active control to download the page after sanitizing the page.

38 Claims, 5 Drawing Sheets

FLIGHT CREATION

FLIGHT BOARDING

FLIGHT CONDUCT

FLIGHT MANAGEMENT

COLLABORATIVE WEB BROWSER

FIELD OF THE INVENTION

The present invention relates generally to systems and methods for browsing computer networks such as the World Wide Web ("Web"), and more particularly to systems and methods for enabling a first computer to present a display of a Web page on one or more second computers.

BACKGROUND

Use of and applications for Internet-related networks, and in particular the so-called "World Wide Web" ("Web"), increases daily. The Web is a network of computer information storage sites, and each site can include one or more information displays, colloquially referred to as "pages". Essentially, a Web site presents advertising or other information regarding a particular organization. A person with a computer and a software system referred to as a "browser" can connect the computer to the Internet (and, hence, to the Web), usually via a telephone line, and with the aid of the browser, access the various Web pages.

It happens that among the many applications of the Web, for various reasons one computer user might desire to discuss a particular Web page or pages with another computer user who is remote from the first user. Accordingly, the users establish communication with each other, and then both log their computers onto the Web. Then, both must access the Web page they desire to discuss by retrieving (colloquially referred to as "downloading") all of the information on the desired Web page to their respective computers.

To download a Web page, a user must either input the page's address, referred to in the art as the uniform resource locator or simply URL, or the user must select the page via a hyperlink from another Web page. Stated differently, a Web page may list many other Web pages that happen to be related to it, with the listings referred to as "hyperlinks", and a user can position a mouse-controlled cursor over a hyperlink and click the mouse to cause the user's browser to access the Web page associated with the selected hyperlink.

Unfortunately, it can be confusing and frustrating for two computer users who are communicating with each other via telephone (or some other means) to coordinate the desired Web page rendezvous. This is in part because, to download a Web page, a large amount of data must ordinarily be transferred at rates that can vary, computer to computer, potentially resulting in idle periods for one user as the other user completes a download. Furthermore, a user's verbal identification of a particular hyperlink on which the user desires another user to "click" can be unclear and ambiguous. As recognized by the present invention, however, it is possible to provide a system and method for allowing a first computer user, referred to herein as a "pilot", to cause the browsers of other computer users, referred to herein as "passengers", to display Web pages as desired by the pilot, without requiring interaction from the passengers and without requiring any modifications to the passengers' software.

Accordingly, it is an object of the present invention to provide a system and method for allowing a first computer user to cause the network browser of a second computer user to present Web pages as desired by the first user. Another object of the present invention is to provide a system and method for causing, from a local computer, one or more Web pages to be displayed on remote computers, without requiring remote user interaction. Still another object of the present invention is to provide an easy-to-use, cost-effective system and method for remotely causing a passenger computer Web browser to display Web pages selected by a pilot computer, without requiring software changes to the passenger computer, other than the temporary loading of an applet. Yet another object of the present invention is to provide a system and method for causing, from a local computer, one or more Web pages to be displayed on remote computers, while presenting a status of the remote computer displays to the user of the local computer.

SUMMARY OF THE INVENTION

A computer program device includes a computer program storage device that is readable by a digital processing system and a program means on the program storage device. As intended by the present invention, the program device is realized in a critical machine component that causes the digital processing system to perform method steps to enable a pilot computer to direct the browser of a passenger computer. Stated differently, a machine component establishes a computer program product for performing method steps for enabling a first computer to cause a second computer to display a preselected page from a computer network by transmitting, from the first computer to a control site in the computer network, a request for the predetermined page.

As disclosed in detail below, the present method steps include retrieving the predetermined page at the control site, and then, if the predetermined page includes pointers to other pages in the network, encoding the pointers to thereby render a first page wherein the pointers, when selected by a computer user viewing the page, direct the user's computer to the control site. Also, the pointers are disabled to thereby render a second page. Per the present invention, the first page is transmitted to the first computer, and the second page is transmitted to the second computer.

In a preferred embodiment, if the first computer has accessed a secondary page, the second computer is caused to display the secondary page. In a particular embodiment, in response to the second computer transmitting a valid code to the control site, and active control, such as an applet, is downloaded from the control site to the second computer. The active control is used in executing the transmitting and displaying steps set forth above.

As intended by the preferred embodiment, if the first computer selects, on the first page, a pointer associated with a hyperlink site, the hyperlink site is defined to be the predetermined page. The above encoding and transmitting steps are then repeated. Desirably, the status of the second computer is reported to the first computer. Also, in response to the entry of data by the first computer in connection with the first page, the data can be electronically combined with the first page for simultaneous display thereof by the first computer.

The computer program product is also disclosed in combination with the digital processing apparatus, and in further combination with the computer network.

In another aspect, a computer-implemented method is disclosed for allowing a pilot computer to cause a passenger computer, which includes a passenger Web browser, to display a predetermined Web page. The method includes transmitting, at the pilot computer, the uniform resource locator (URL) of the predetermined page to a control site. The control site is a member of the Web, such that the control site can retrieve the predetermined page. Then, at the passenger computer, a code is transmitted to the control site and, if the code is valid, an active control is received from the control site. Next, the active control cooperates with the passenger Web browser to download the predetermined Web page from the control site.

In still another aspect, a system is disclosed for allowing a pilot computer to cause a passenger computer including a passenger Web browser to display a predetermined Web page. The system includes, at the pilot computer, logic means for transmitting the uniform resource locator (URL) of the predetermined page to a control site, wherein the control site is a member of the Web. At the control site, logic means are provided for retrieving the predetermined page, and at the passenger computer logic means are provided for transmitting a code to the control site. Moreover, at the control site logic means determine whether the code is valid, and if so, logic means transmit in response thereto an active control to the passenger computer. Additionally, logic means cause the active control to cooperate with the passenger Web browser to download the predetermined Web page from the control site.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
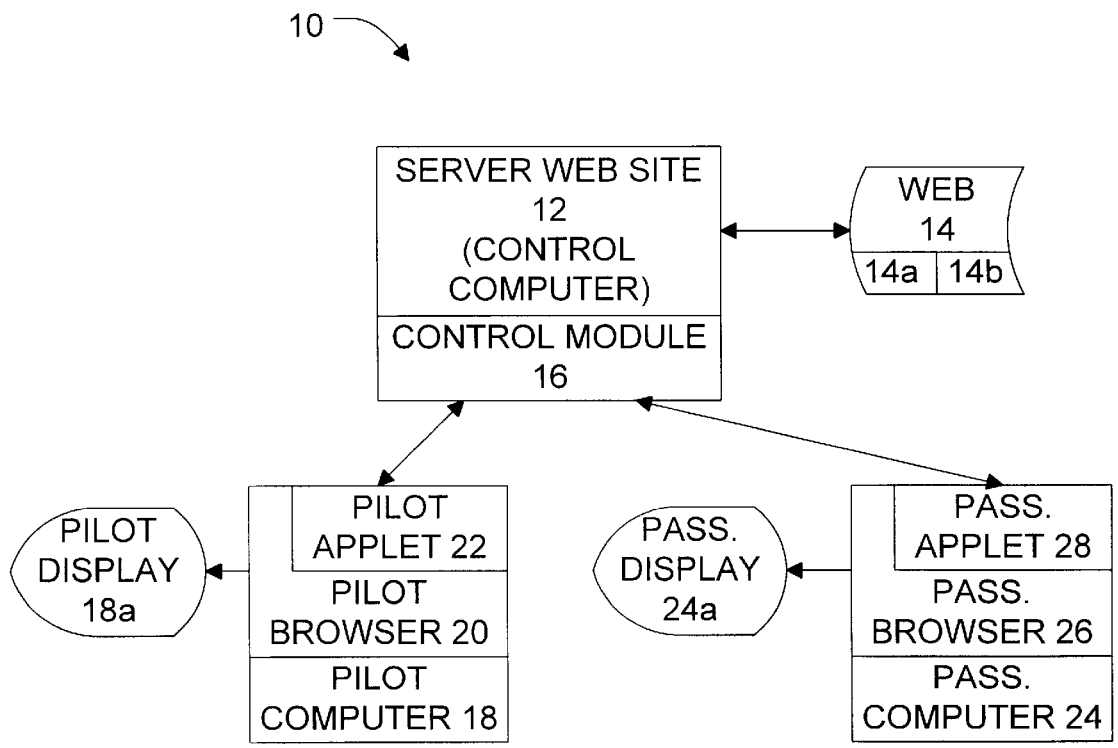
FIG. 1 is a functional block diagram of the present invention.

Referring initially to FIG. 1, a system is shown, generally designated 10, which includes a server computer, hereinafter referred to as a "control computer" 12, which is part of a computer network. In the preferred embodiment, the control computer 12 is part of the computer network 14 referred to as the World Wide Web ("Web"). As is well known, the Web 14 includes a plurality of sites, colloquially referred to as Web pages 14a, 14b, etc. Those skilled in the art will recognize that the control computer 12 can access the pages 14a, 14b of the Web 14 by well-known means.

As discussed further below, the control computer 12 includes a control module 16 which enables a first computer, referred to herein as a "pilot" computer, to control the network navigating systems (referred to herein as "Web browsers") of one or more second computers, referred to here as "passenger computers". Accordingly, FIG. 1 shows that a pilot computer 18 has a pilot Web browser 20, and associated with the pilot Web browser 20 is a pilot active control, preferably a small application program colloquially referred to as an "applet" 22. The pilot applet 22 can cause the pilot Web browser 20 to communicate with the control module 16 via a computer network, e.g., the internet 23 shown. Similarly, FIG. 1 shows one or more passenger computers (only a single passenger computer 24 shown in FIG. 1 for clarity), and the passenger computer 24 has a passenger Web browser 26. A passenger active control, preferably a passenger applet 28, is associated with the passenger browser 26 to cause the passenger browser 26 to communicate with the control module 16 via the internet 23. The pilot computer 18 and passenger computer 24 can be any suitable user computer, e.g., a personal computer or laptop computer, each having a respective video monitor or flat panel display 18a, 24a for presenting Web pages 14a, 14b thereon. Also the browsers 20, 26 can advantageously be commercial browsers, such as are made by Netscape or Microsoft Corp.

Figure 2:
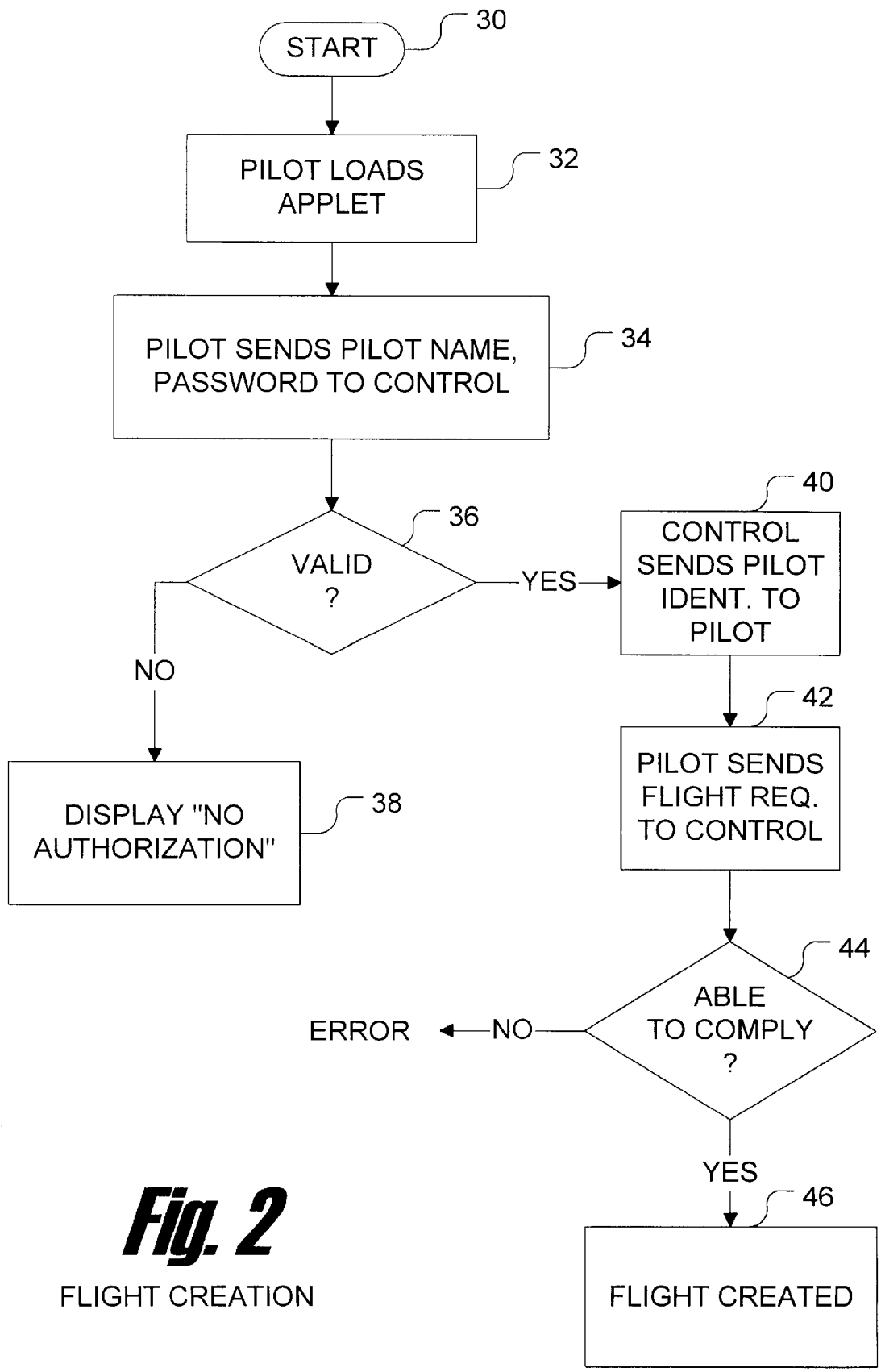
FIG. 2 is a flow chart showing the flight creation process of the present invention.
Figure 3:
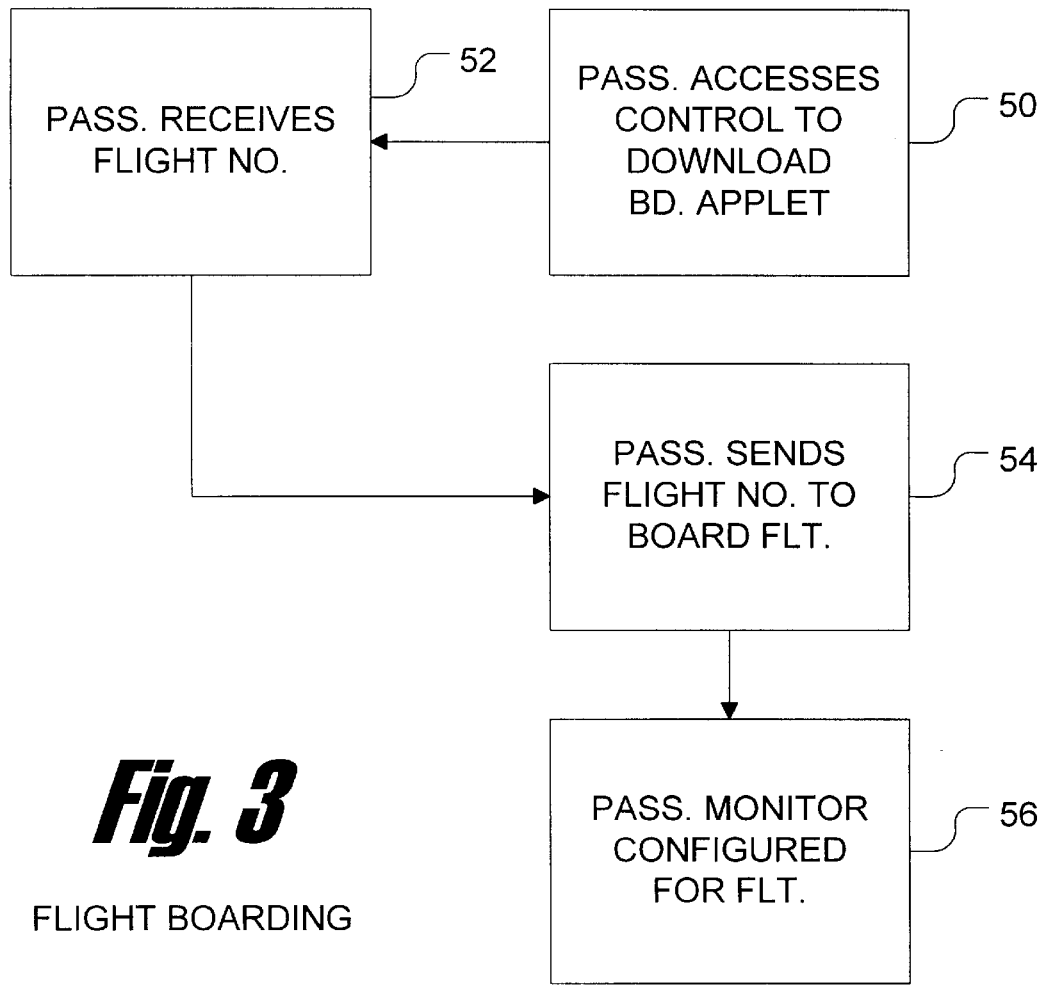
FIG. 3 is a flow chart showing the flight boarding process.
Figure 5:
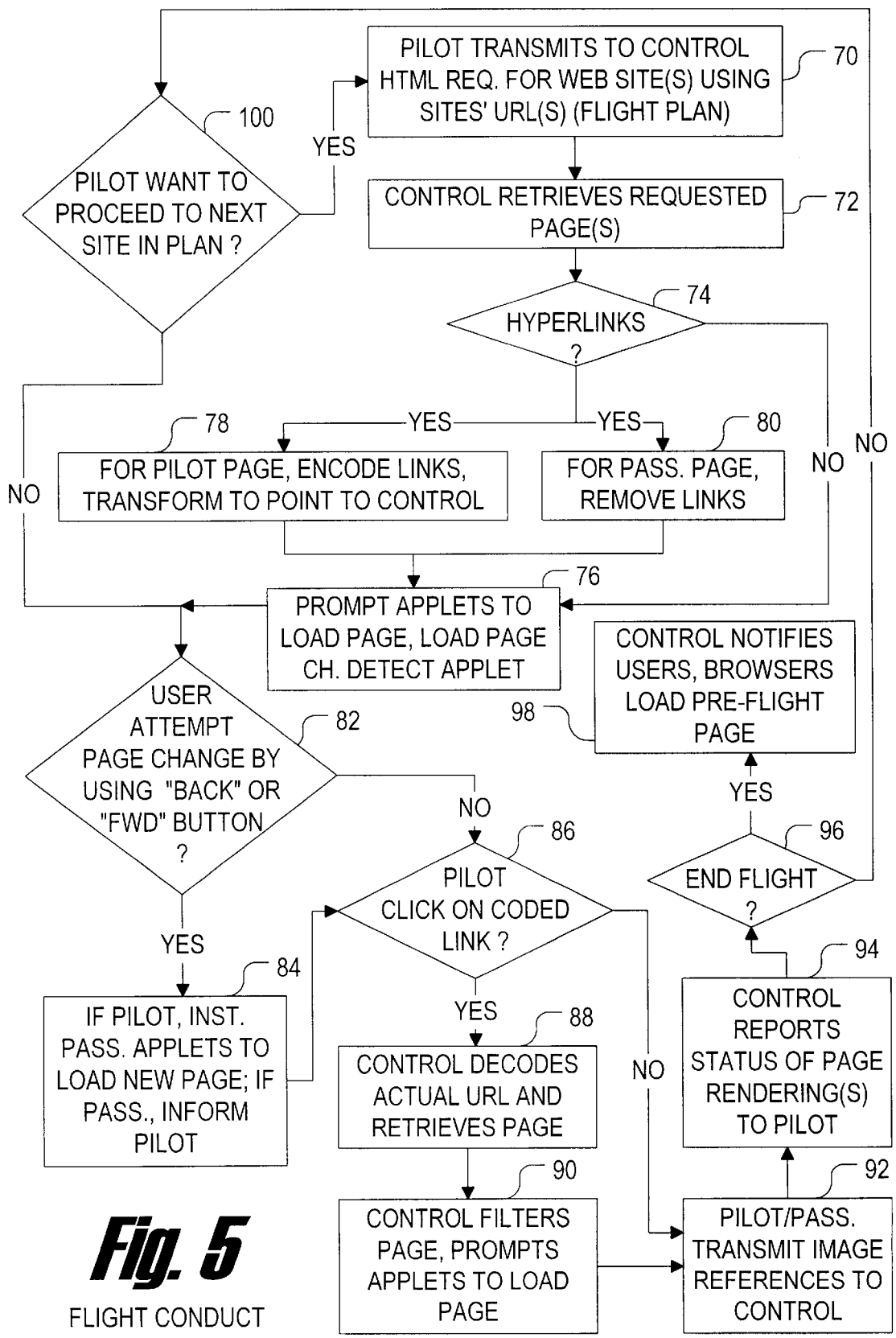
FIG. 5 is a flow chart showing the flight conduct process.

FIGS. 2, 3 and 5 illustrate the structure of the control module 16 and applets 22, 28 of the present invention as embodied in computer program software. Those skilled in the art will appreciate that the Figures illustrate the structures of logic elements such as computer program code elements or logic circuits, that function according to this invention. Manifestly, the invention is practiced in its essential embodiment by a machine component that renders the logic elements in a form that instructs a digital processing apparatus (that is, a computer) to perform a sequence of function steps correponding to those shown in the Figures.

These instructions may reside on a program storage device including a data storage medium, such as a computer diskette. Alternatively, such media can also be found in semiconductor devices, on magnetic tape, on optical disks, on a DASD array, on a conventional hard disk drive, on electronic read-only memory or on electronic random access memory, or other appropriate data storage device. In an illustrative embodiment of the invention, the logic means are computer-executable instructions that are written in the Java language.

FIG. 2 shows the initialization process of the present invention. As can be understood from the above discussion, the present invention uses airline terminology for ease of illustration and understanding. For example, a Web site tour through which the user of the pilot computer 18 plans to guide the passenger computer 24 is referred to as a "flight". Accordingly, the initialization process shown in FIG. 2 can be considered a flight creation process which commences at start state 30 and moves to block 32, wherein the pilot computer 18 loads the pilot applet 22. Preferably, the pilot applet 22 includes a flight creation applet. In the preferred embodiment, the pilot applet 22 is downloaded from the control module 16. The flight creation applet enables the pilot computer to transmit the user name and password of the user of the pilot computer 18. At decision diamond 36, the control module 16 determines whether the user name and password are valid, and if not causes the pilot computer 18 to display a message at block 38 indicating that the pilot computer 18 lacks the necessary authorization to create a flight.

On the other hand, if the password is valid the control computer proceeds to block 40 to send a pilot identification code, colloquially referred to as a "cookie", to the pilot computer 18. With this pilot identification code, the flight creation applet permits the pilot computer 18, at block 42, to transmit a flight request to the control module 16 using HTTP protocol. This flight request lists one or more Web pages to which the user of the pilot computer 18 wishes to guide the passenger computer(s) 24. Also, the flight request can include other data, such as the identifications of the intended passenger computers.

Proceeding to decision diamond 44, the logic of the system 10 next determines whether the control module 16 is able to comply with the requested flight. If not, an error message is returned, but otherwise the control module 16 creates the requested flight at block 46 by generating a flight number for the flight and recording information pertinent thereto, e.g., the desired Web pages.

It is next necessary that the passenger computer 24 relinquish control of the passenger browser 26 to the pilot computer 18 by "boarding" the flight thus created. A passenger can board a flight at any time during the flight. Accordingly, referring now to FIG. 3, at block 50, using its Web browser 26 the passenger computer 24 accesses the control module 16 using the appropriate URL to download a boarding applet therefrom. Then, at block 52 the user of the pilot computer 18 communicates to the passenger computer 24 user, via voice, e-mail, or other means, the flight number of the flight created at block 46 of FIG. 2. Using the boarding applet, at block 54 the user of the passenger computer 24 sends the flight number to the control module 16, and in response, assuming the flight number sent by the passenger computer 24 is valid, the control module 16 causes the boarding applet to download a passenger applet to the passenger computer 24. The passenger computer can also send its identification to the control module 16. As indicated at block 56, when the passenger applet is downloaded, the display 24a of the passenger computer 24 is configured for the flight as shown in FIG. 4.

Figure 4:
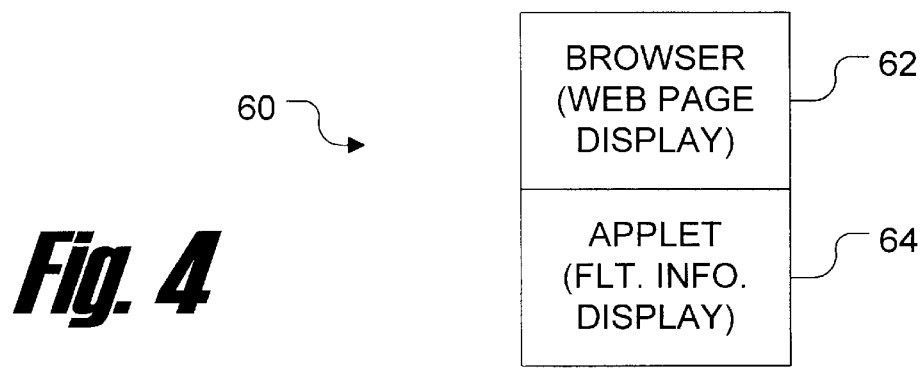
FIG. 4 is a schematic diagram showing a user display.

FIG. 4 shows that in the preferred configuration of the displays 18a, 24a of the computers 18, 24, the displays 18a, 24a are divided in two windows. On the top window is the computer's respective browser 20, 26 display, which presents, among other things, Web pages. In contrast, as shown in FIG. 4 the bottom window presents information pertaining to the flight applets disclosed below. In other words, the bottom window of each displays 18a, 24a presents information pertaining to the current flight.

Now referring to FIG. 5, the flight conduct method steps can be seen. It is to be understood that while FIG. 5 is depicted in flow chart format for ease of disclosure, some of the processes shown in FIG. 5 can be continuously undertaken in parallel with each other.

Commencing at block 70, the pilot computer 18 transmits to the control module 16 a request for a predetermined Web page. It is to be understood that the request can be in the form of an instruction to execute the flight plan developed above, which plan, it will be recalled, includes the URLs of the Web pages to be accessed. In response, at block 72 the control module 16 retrieves the requested Web page.

Next, at decision diamond 74 the control module 16 determines whether the requested information contains any hyperlinks to other Web sites. When the requested information is an HTML-formatted Web page, the test at decision diamond 74 is positive, but otherwise it is negative. Thus, if the information requested at block 72 is not a Web page, i.e., if it is a non-HTML image, postscript, etc., the logic moves to block 76, wherein the control module 16 prompts the applets 22, 28 to cause the browsers 20, 26 to download the requested information into the respective computers 18, 24. Also at block 76, a page change detect applet is downloaded along with the information.

On the other hand, if it is determined at decision diamond 74 that the requested information is a Web page and that consequently it is likely to contain hyperlinks to other Web sites, the logic proceeds to blocks 78 and 80. At block 78, the control module renders a pilot version of the requested Web page by filtering the page as follows. All of the hyperlinks of the requested Web page are encoded to point back to the control computer 12. Stated differently, after encoding the hyperlinks of the requested Web page, as presented to the user of the pilot computer 18, are in all substantial respects identical to the unencoded hyperlinks, except that when selected, the hyperlinks point not to their associated Web pages, but rather to the control computer 12.

In contrast, at block 80 a passenger version of the requested Web page is rendered by sanitizing the requested Web page by removing or otherwise disabling all of the hyperlinks of the requested Web page. Then, at block 76 the filtered and sanitized versions of the requested Web page are sent to the pilot and passenger computers 18, 24, respectively.

From block 76, the logic moves to decision diamond 82, to determine, using the page change detect applets, whether any user (pilot or passenger) has attempted to change that user's presented Web page. For example, a user might select the "BACKWARD" or "FORWARD" icon that most Web browsers feature, to retrieve other previously accessed Web pages.

If a page change detect applet detects a selection of an alternate Web page on the part of the pilot computer 18, the applet communicates the page change to the control module 16, which in turn instructs the passenger applet 28 to cause the passenger browser 26 to display the alternate Web page. Also, in the event that the pilot computer 18 has designated that a passenger computer assume a co-pilot computer function as discussed below, the page change detect applet prevents the applet of the co-pilot computer, after changing its page, from repeating the page change order to the other user computers (pilot and passenger), to thereby avoid endless loops of page change orders. In contrast, if a page change detect applet detects a selection of an alternate Web page on the part of the passenger computer 24, the applet communicates the change to the control module 16, and the control module 16 causes the lower window of the pilot display 18a to display a message indicating that the passenger computer 24 has selected another Web page for display.

Recall that the Web page presented to the user of the pilot computer 18 presents encoded versions of the hyperlinks of the selected Web page. Moving to decision diamond 86 from block 84 or from decision diamond 82 if the test there was negative, it is determined whether the user of the pilot computer 18 has selected one of the encoded hyperlinks. If the pilot has clicked on a hyperlink, the logic moves to block 88, wherein the control module 16 receives the hyperlink and decodes it to identify the associated Web page. The control computer 12 then retrieves the associated Web page.

Next, at block 90, the control module 16 filters and sanitizes the retrieved page as disclosed previously in reference to blocks 78 and 80, and prompts the passengers' applets to download the processed pages as described above in relation to block 76. It is to be understood that when the user of the pilot computer 18 has selected (i.e., has "clicked on") a hyperlink, the pilot browser 20 immediately loads the filtered page from the control module 16, without awaiting instructions to do so from the pilot applet 24. From block 90, or from decision diamond 86 if the pilot did not click on a hyperlink, the logic moves to block 92.

At block 92, the pilot and passenger applets 22, 28 transmit messages to the control module 16 that are representative of the images presented on the displays 18a, 24a. If desired, at block 94 the passenger computer 24 data can be relayed to the pilot computer 18, to enable the pilot computer 18 to monitor the status of the presentation on the passenger display 24a. In any case, it may now be understood that data pertaining to the conduct of the flight is stored for future retrieval and reuse.

Moving next to decision diamond 96, the logic determines whether the pilot computer 18 has signified a desire to end the current flight. If so, the logic moves to block 98, wherein the control module 16 notifies all users that the flight has been ended, and the applets 22, 28 relinquish control of the browsers 20, 26 after causing the displays 18a, 24a to present the respective screens that were presented before the flight commenced.

If the flight hasn't ended, however, the logic moves from decision diamond 96 to decision diamond 100, wherein it is determined whether the pilot computer 18 desires to proceed to the next Web site in the flight plan. If so, the logic moves to block 70, but otherwise loops back to decision diamond 82 to proceed as described above.

It may now be appreciated that by using small, downloaded applets, the above flight conduct, i.e., the transfer of control of the passenger browser 26 to the pilot computer 18, is accomplished without requiring the pre-loading of software that is specific to the system 10 at the pilot computer 18 or passenger computer 24. Furthermore, by using standard HTTP protocol, the transfer of control of the passenger browser 26 to the pilot computer 18 is accomplished without requiring special proxies, firewall additions, or exceptions at either the pilot computer 18 or passenger computer 24.

Figure 6:
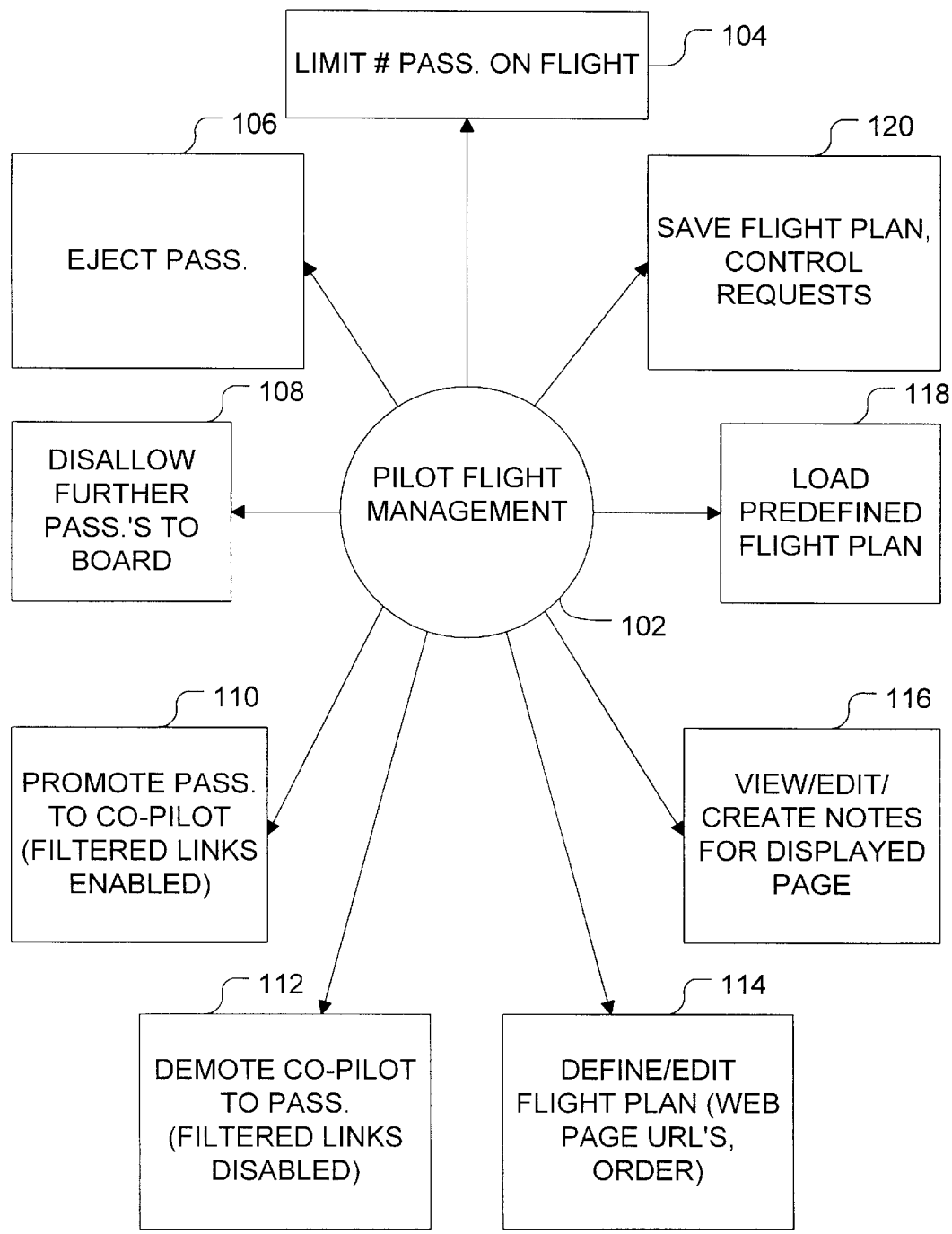
FIG. 6 is a state diagram showing the flight management process.

Now referring to FIG. 6, the flight management logic of the present invention is shown. It is to be understood that the pilot computer 18 assumes the pilot flight management state 102 concurrently with the operations undertaken above in reference to FIG. 5. It is to be further understood that the flight management steps shown in FIG. 6 can be instigated by an HTML request from the pilot computer 18 to the control computer 16 to undertake the various flight management tasks shown.

As shown in FIG. 6, the logic can move to a state 104 in which the control module 16 is instructed to limit the number of passengers permitted on a flight to a predetermined number. Or, the logic can move to state 106 to eject a passenger during flight, or to state 108 to disallow preselected passengers from boarding the flight. Additionally, the logic can move to state 110 to promote a passenger computer to co-pilot status. When in co-pilot status, a user is presented with the filtered version of the Web page instead of the sanitized version, but otherwise assumes no other pilot functions. Thereby, a co-pilot computer can be allowed limited control to "click" on hyperlinks, which clicks are then processed as they are for the pilot computer 18.

Moreover, the logic can move to state 112 to demote a co-pilot user to passenger status. Or, at state 114 the pilot computer 18 can define and edit flight plans, including ordering the sequence in which it is desired that a flight retrieve preselected Web pages having associated URLs. Still further, at state 116 the pilot computer 18 can create notes on the filtered Web page presented on the pilot display 18a, and edit and review notes that might have been previously made. And, at state 118 the pilot computer 18 can load a predefined flight plan such that the pilot and passenger computers automatically are "flown" to various predetermined Web sites, and save the plan at state 120. Also, as stated above requests and other communications made by the users of the system 10 to the control module 16 are saved for analysis off-line.

While the particular BROWSER CONTROLLER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A computer system, comprising:
   at least one first computer connected to a computer network;
   one or more second computers connected to the computer network;
   a control site computer connected to the computer network;
   a computer program storage device associated with said control site computer; and
   a program means on the program storage device and including instructions executable by said control site computer for performing a method of enabling a first computer to cause at least one of said one or more second computers to display a selected file from said computer network, the method comprising
      receiving a request for the selected file from the first computer, the request including and address of said selected file;
      retrieving the selected file from the address included in said request;
      if the selected file includes pointers to other files in the network, (1) encoding one or more of the pointers to render a first file wherein the pointers, when selected by a computer user viewing the file, direct the user's computer to the control site, and (2) disabling the pointers from the selected file to thereby render a second file;
      transmitting the first file to the first computer; and
      transmitting the second file to the second computer.

2. The system of claim 1, wherein the method further comprises:
   if the first computer has accessed a secondary file, causing the second computer to display the secondary file.

3. The system of claim 1, wherein the method further comprises:
   in response to the second computer transmitting a valid code to the control site, downloading from the control site to the second computer an active control; and
   instructing the active control to cause the second file to be downloaded to the second computer.

4. A computer-implemented method for allowing a pilot computer to cause a passenger computer including a passenger Web browser to display a predetermined Web page, comprising the steps of:
   at the pilot computer, transmitting the uniform resource locator (URL) of the predetermined page to a control site, the control site being a member of the Web, such that the control site can retrieve the predetermined page;
   at the passenger computer, transmitting a code to the control site and, if the code is valid, receiving in response thereto an active control from the control site; and
   causing the active control to cooperate with the passenger Web browser to download the predetermined Web page from the control site.

5. The computer-implemented method of claim 4, wherein the pilot computer includes a pilot Web browser, and the method further comprises the steps of:
   at the pilot computer, receiving an active control from the control site; and
   causing the active control of the pilot computer to cooperate with the pilot Web browser to download the predetermined Web page from the control site.

6. The computer-implemented method of claim 5, wherein prior to downloading the Web page to the pilot computer, hyperlinks from the Web page to other pages on the Web are encoded to point to the control site.

7. The computer-implemented method of claim 6, wherein prior to downloading the Web page to the passenger computer, hyperlinks from the Web page to other pages on the Web are disabled.

8. The computer-implemented method of claim 7, further comprising the step of determining whether the pilot computer has accessed a secondary page, and if so, causing the active control at the passenger computer to cooperate with the passenger Web browser to display the secondary page.

9. The computer-implemented method of claim 8, wherein the passenger computer includes a data display, and the method further comprises the steps of:

in response to the pilot computer selecting a hyperlink on the Web page,
(1) causing the control site to decode the URL associated with the hyperlink;
(2) at the control site, retrieving the associated Web page;
(3) causing the active control at the passenger computer to cooperate with the passenger Web browser to download the associated Web page from the control site; and
(4) reporting to the pilot computer the status of the passenger computer display.

10. A system for allowing a pilot computer to cause a passenger computer including a passenger Web browser to display a predetermined Web page, comprising:

at the pilot computer, logic means for transmitting the uniform resource locator (URL) of the predetermined page to a control site, the control site being a member of the Web;
at the control site, logic means for retrieving the predetermined page;
at the passenger computer, logic means for transmitting a code to the control site;
at the control site, logic means for determining whether the code is valid, and if so, transmitting in response thereto an active control to the passenger computer; and
logic means for causing the active control to cooperate with the passenger Web browser to download the predetermined Web page from the control site.

11. The system of claim 10, wherein the pilot computer includes a pilot Web browser, and the system further comprises:

at the pilot computer, logic means for receiving an active control from the control site; and
logic means for causing the active control of the pilot computer to cooperate with the pilot Web browser to download the predetermined Web page from the control site.

12. The system of claim 11, further comprising:

logic means for encoding hyperlinks from the Web page to other pages on the Web to point to the control site prior to downloading the Web page to the pilot computer; and
logic means for disabling hyperlinks from the Web page to other pages on the Web prior to downloading the Web page to the passenger computer.

13. The system of claim 12, further comprising logic means for determining whether the pilot computer has accessed a secondary page, and if so, causing the active control at the passenger computer to cooperate with the passenger Web browser to display the secondary page.

14. The system of claim 13, wherein the passenger computer includes a data display, and the system further comprises:

logic means for enabling the pilot computer to select a hyperlink on the Web page;
logic means for decoding the URL associated with the hyperlink;
logic means for retrieving the associated Web page to the control site;
logic means for causing the active control at the passenger computer to cooperate with the passenger Web browser to download the associated Web page from the control site; and
logic means for reporting to the pilot computer the status of the passenger computer display.

15. The system of claim 14, in combination with a computer network.

16. A computer program product embodying program instructions operating on at least one control computer for enabling one or more first computers to cause one or more selected files to be viewed on at least one second computer, the program product comprising program instructions for:

receiving from the first computer, an address of a first one of said one or more selected files;
retrieving said first one of said one or more selected files according to said address;
disabling pointers in said retrieved file to create a modified file; and
sending said modified file to said second computer.

17. The computer program product of claim 16, further comprising program instructions for:

encoding said pointers in said retrieved file to point the user's computer back to said control computer, thereby creating a second modified file; and
sending said second modified file to said first computer.

18. The computer program product of claim 16, further comprising program instructions for repeating said steps of receiving, retrieving, disabling and sending for one or more subsequent ones of said selected files.

19. The computer program product of claim 16, further comprising program instructions for:

receiving a code from the second computer;
verifying said code to determine whether it is a valid code, authorizing access at least one of said one or more selected files; and
sending an active control to said second computer, wherein said active control causes said second computer to retrieve said at least one selected file from said control computer.

20. The computer program product of claim 19, wherein said active control is an applet.

21. The computer program product of claim 16, wherein said file comprises at least one of the group of an HTML file, text document, stored data stream and dynamically generated data stream.

22. A computer program product embodying program instructions running on at least one control computer for enabling a first user at a first computer to conduct a collaborative web session with one or more second users at one or more second computers, the program product comprising program instructions for:

receiving from the first computer, a URL idenfifying a web address of a selected one of one or more web files, wherein said selected web file is chosen by said first user as a file to be viewed during the collaborative session;

retrieving said selected web file using the received URL; and providing said retrieved web file to said one or more second computers for viewing by said one or more second users.

23. The computer program product of claim 22, further comprising program instructions for modifying the retrieved web file to disable pointers therein, prior to providing said file to said one or more second computers.

24. The computer program product of claim 22, further comprising program instructions for:

encoding said pointers in said retrieved file to point the first user's computer back to a control computer, thereby creating a second modified file; and sending said second modified file to said first computer.

25. The computer program product of claim 22, further comprising program instructions for repeating said steps of receiving, retrieving, and providing for subsequently selected web files.

26. The computer program product of claim 22, further comprising program instructions for:

receiving a code from at least one of said second computers; and verifying said code to determine whether it is a valid code, authorizing said second user at said second computer to participate in the collaborative web session.

27. The computer program product of claim 22, wherein said program instructions for providing said retrieved web file to said one or more second computers comprise sending an active control to said one or more second computers, wherein said active control causes said one or more second computers to retrieve said at least one selected web file.

28. The computer program product of claim 27, wherein said active control causes said one or more second computers to retrieve said web file from said control computer.

29. A control-site computer system for enabling one or more first computers to cause one or more selected files to be viewed on at least one second computer, comprising:

means for receiving from the first computer, an address of a first one of said one or more selected files;

means for retrieving said first one of said one or more selected files according to said address;

means for disabling pointers in said retrieved file to create a modified file; and means for sending said modified file to said second computer.

30. The control-site computer of claim 29, further comprising:

means for encoding said pointers in said retrieved file to point the user's computer back to said control computer, thereby creating a second modified file; and means for sending said second modified file to said first computer.

31. The control-site computer of claim 29, further comprising:

means for receiving a code from the second computer;

means for verifying said code to determine whether it is a valid code, authorizing access at least one of said one or more selected files; and means for sending an active control to said second computer, wherein said active control causes said second computer to retrieve said at least one selected file from said control computer.

32. A system for enabling at least one first user to conduct second users on a collaborative web session of one or more files, comprising:

a control site computer;

a first computer for use by a first user, the first computer in communication with said control site computer via the web;

a second computer having access to said control site computer via the web;

first computer program means executable by said first computer and allowing the first user to select a page for said web session, wherein said first computer program means provides a URL of said selected page to the control site; and control site computer program means executable by said control site computer to receive from the first computer, the URL identifying a web address of the selected web file, retrieve said selected web file using the received URL, and provide said retrieved web file to one or more second computers for viewing by said one or more second users.

33. The system of claim 32, further comprising program means executable by the control site computer to modify the retrieved web file to disable pointers therein, prior to providing said file to said one or more second computers.

34. The system of claim 32, further comprising program means executable by the control site computer to:

receive an code from at least one of said second computers; and verify said code to determine whether it is a valid code, authorizing said second user at said second computer to participate in the web session.

35. The system of claim 32, further comprising program means executable by the control site computer to provide an active control to said one or more second computers, wherein said active control causes said one or more second computers to retrieve said at least one selected web file from the control site computer.

36. A control-site computer system executing computer program code for enabling one or more first computers to conduct an interactive web session with at least one second computer, said computer program code comprising code means for:

receiving from the first computer, an address of a first one of one or more selected files for the interactive web session;

retrieving said first one of said one or more selected files according to said address;

disabling pointers in said retrieved file to create a modified file; and sending said modified file to said second computer.

37. The control-site computer system of claim 36, further comprising code means for:

encoding said pointers in said retrieved file to point the user's computer back to said control computer, thereby creating a second modified file; and sending said second modified file to said first computer.

38. The control-site computer system of claim 36, further comprising code means for:

receiving a code from the second computer;

verifying said code to determine whether it is a valid code, authorizing access at least one of said one or more selected files; and sending an active control to said second computer, wherein said active control causes said second computer to retrieve said at least one selected file from said control computer.

\* \* \* \* \*

UNITED STATES PATENT AND TRADEMARK OFFICE
CERTIFICATE OF CORRECTION

PATENT NO.   : 5,944,791
DATED        : August 31, 1999
INVENTOR(S)  : Andrew W. Scherpbier It is certified that error appears in the above-identified patent and that said Letters Patent is hereby corrected as shown below:

Column 2, Line 39: delete "and" and insert --an--

Column 8, Claim 1, Line 19: delete "and" and insert --an--

Signed and Sealed this

First Day of August, 2000

Attest:

Attesting Officer

Q. TODD DICKINSON

Director of Patents and Trademarks